United States Patent [19]
Sumner et al.

[11] 3,844,312
[45] Oct. 29, 1974

[54] RAPID EQUALIZING TIGHT SHUT-OFF INTERNAL CONTROL VALVE

[75] Inventors: William D. Sumner, McKinney; Gary L. Koch, Allen, both of Tex.

[73] Assignee: Fisher Controls Company, Inc., Marshalltown, Iowa

[22] Filed: July 30, 1973

[21] Appl. No.: 383,740

Related U.S. Application Data

[63] Continuation of Ser. No. 200,909, Nov. 22, 1971, abandoned.

[52] U.S. Cl.................. 137/630, 137/460, 137/462
[51] Int. Cl............................................. F16k 17/30
[58] Field of Search ...... 137/460, 462, 630, 630.11, 137/630.15; 251/15, 38

[56] References Cited
UNITED STATES PATENTS

| | | | |
|---|---|---|---|
| 2,376,383 | 5/1945 | Richards............................ | 137/460 |
| 2,630,137 | 3/1953 | Krone et al......................... | 137/630 |
| 2,750,956 | 6/1956 | Stevenson........................... | 137/460 |
| 3,164,359 | 1/1965 | Dyer et al.......................... | 251/38 X |
| 3,183,928 | 5/1965 | Rosenberg......................... | 137/460 |
| 3,631,893 | 1/1972 | Seaman et al. .................... | 137/630 |

*Primary Examiner*—Robert G. Nilson
*Attorney, Agent, or Firm*—James C. Bolding; Harold R. Patton

[57] ABSTRACT

Described herein are improved internal valves for use with pressurized containers such as those for storing, or transporting, liquified petroleum gas (LPG). The internal valve is arranged to include a main valve mechanism fitted within the pressure tank and a chamber of the valve. Guiding mechanisms are provided to guide the main valve member and a pressure-bleed pilot valve member as they are urged away from their valve seats. The pilot valve member is actuated by a stem arranged to pass through a pilot orifice formed within the main valve member. The stem and pilot orifice dimensions are chosen and the stem guided in such a manner that a large, substantially unrestricted bleed passage is provided through the main valve member so that, during the valve opening operation, the pressures on both sides of the main valve member may be rapidly equalized. Shut-off means are provided to effect closure of the bleed passage when the main valve member checks shut as a result of excess flow conditions.

9 Claims, 12 Drawing Figures

RAPID EQUALIZING TIGHT SHUT-OFF INTERNAL CONTROL VALVE

This application is a continuation of Ser. No. 200,909, Nov. 22, 1971, now abandoned.

FIELD OF THE INVENTION

The present invention relates generally to internal control valves, and more particularly, to an internal valve of the type employed in discharging liquified petroleum gas, or the like, from storage tanks, and wherein both rapid equalization of pressure across the valve and tight shut-off under emergency conditions may be achieved.

BACKGROUND OF THE INVENTION AND DESCRIPTION OF THE PRIOR ART

It is well known to employ internal valves in the transfer of fluids, such as LP-gas and anhydrous ammonia. Internal valves are generally defined as primary shut-off valves for containers and having external means for actuation. They are constructed so that their seats are positioned within the container. So constructed, external damage to the valves will not prevent effective valve seating. Such valves are normally installed in the filling and discharge openings of pressure vessels and in piping systems (with or without pumps or compressors) to shut-off or check the flow when it becomes excessive and therefore, indicative of the existence of a dangerous situation; see for example, U.S. Pat. No. 3,164,359, entitled "Safety Flow Valve" to Dyer et al.

In conventional internal valves, it is common practice to employ a pilot valve operable by means of a valve stem to bleed pressure through the main valve member to effect its opening. Such valves, with which we are familiar, require long periods (in the order of minutes) to complete the pressure bleed necessary to achieve pressure equalization across the main valve member. In many instances, this is a result of the bleedpassage being restricted by the sized stem which allows a minimum leakage should the main valve check shut while the pilot valve is held spaced from the bleed orifice. In addition, such prior art valves do not provide for tight or "zero" leakage shut-off when the main valve checks shut in emergency situations.

BRIEF SUMMARY OF THE INVENTION

The general purpose of this invention is to provide an improved internal control valve which embraces the advantages of similarily employed valves, yet overcomes the above-described deficiencies. To attain this, the present invention utilizes a unique valve stem arranged to cooperate with the bleed orifice and passage through the main valve mechanism, such that the pressure bleed orifice and passage can be made as large as desirable, thereby permitting extremely rapid (in the order of seconds) pressure equalization across the valve. In addition, the bleed orifice passage may be effectively closed tightly when the main valve checks shut due to excess fluid flow, thereby to prevent hazardous leakage.

An object of the present invention is the provision of an improved internal control valve which permits rapid pressure equalization, thereby decreasing the total time required to transfer fluid from a storage tank through a pipe or the like.

Another object of the present invention is the provision of an improved internal control valve of the type having an excess-flow, check valve mechanism in combination with a pilot valve for rapid pressure equalization, wherein tight shut-off is effected upon the closing of the valve in response to an excess-flow condition.

Still another object of the present invention is the provision of an improved safety flow control valve responsive to excess-flow conditions which may be readily and economically assembled during manufacture.

In the present invention, these purposes (as well as others apparent herein) are achieved generally by providing a valve including a guide member, an outlet port, and a chamber positioned between the outlet port and a main valve seat. A main valve member is guided for movement toward and away from the main valve seat. The main valve member is urged by an excess-flow spring in a direction away from the main valve seat, and includes a pilot valve orifice which cooperates with a pilot valve member urged by a shut-off spring in a direction to close the pilot valve orifice. A valve stem extends from the valve chamber through the pilot valve orifice to form an enlarged bleed orifice and passage. The valve stem causes the pilot valve member to move away from the orifice upon actuation by means of a cam mounted within the valve body chamber. By means of this arrangement, the bleed passage is substantially unrestricted so that pressure equalization of the valve may be effected rapidly. Tight shut-off seal means is provided which restricts the pilot ofifice should the main valve check shut in emergency situations and while the pilot valve is held such that it is unable to close the bleed orifice.

BRIEF DESCRIPTION OF THE DRAWINGS

Utilization of the present invention will become apparent to those skilled in the art from the disclosures made from the following description, as illustrated in the accompanying drawings, in which:

FIG. 9a and 9b are cross-sectional views of an alternative embodiment of the valve of the present invention; FIG. 9a showing both the pilot valve and main valve closed and FIG. 9b showing the pilot valve open and the main valve checked shut.

DETAILED DESCRIPTION OF AN EMBODIMENT OF THE INVENTION

Figure 1:
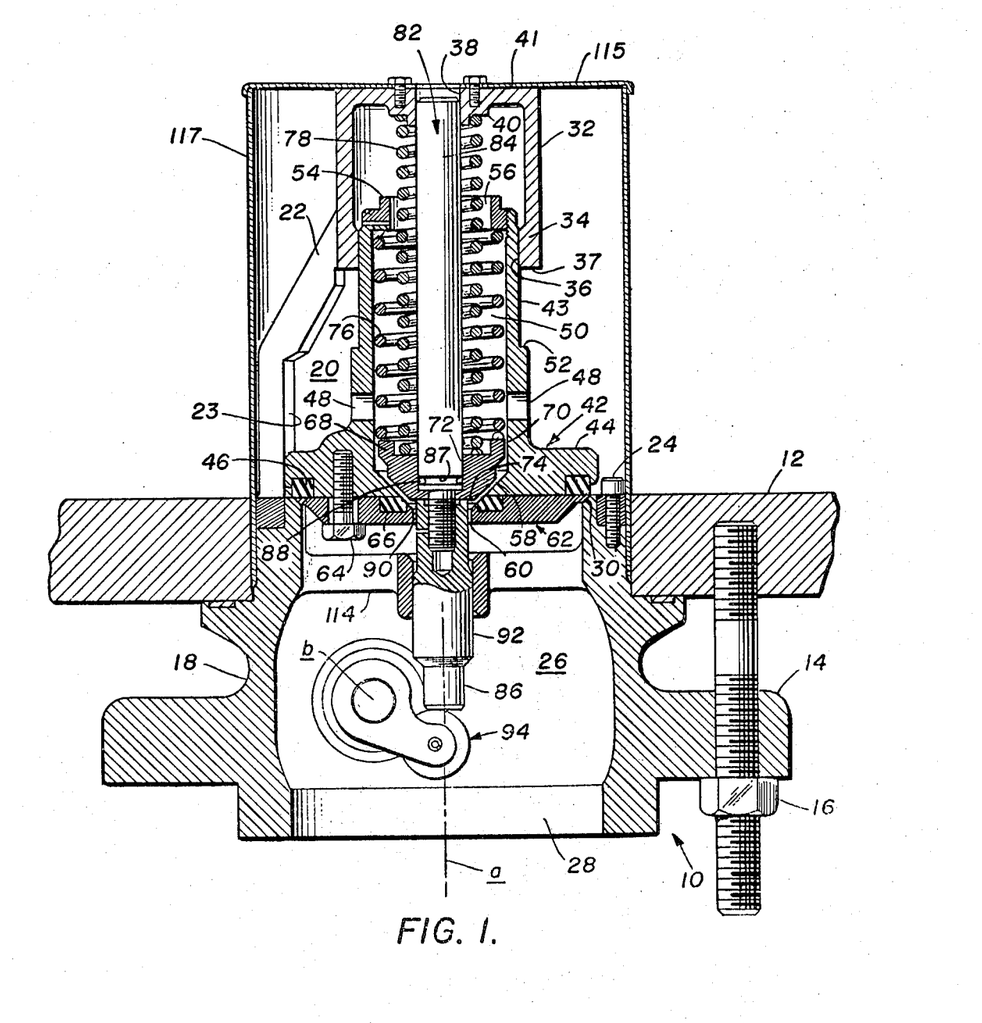
FIG. 1 is a cross-sectional view of one embodiment of an internal control valve constructed in accordance with the present invention, the main valve and pilot valve members being shown in their closed positions, and the valve shown secured to a storage tank.
Figure 2:
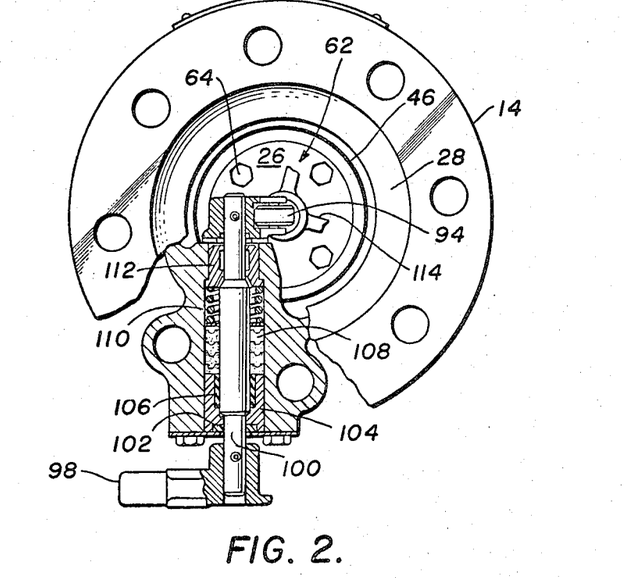
FIG. 2 is a plan view taken from the bottom of the valve of FIG. 1, with it removed from the tank and broken away to provide a detailed view of a cam mechanism for opening and closing the valve.
Figure 3:
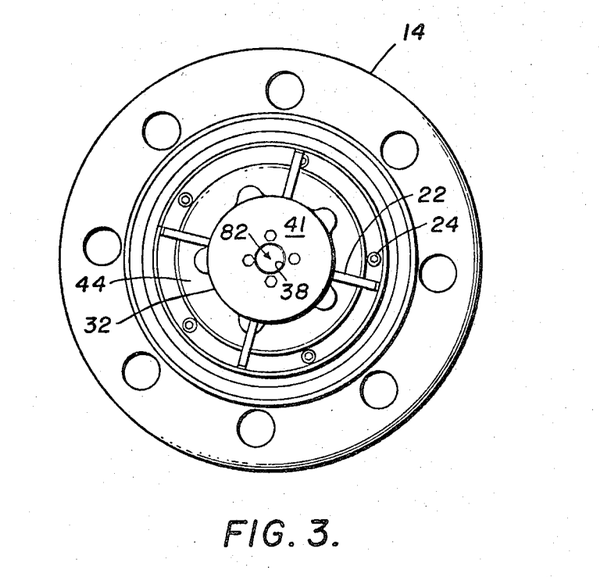
FIG. 3 is a plan view taken from the top of the valve of FIG. 1, removed from the tank and its strainer and retainer plate removed.

Referring now to the drawings, wherein like reference characters designate like or corresponding parts throughout the several views, there is shown in FIGS. 1, 2 and 3, an improved safety flow control valve, generally designated 10. The safety flow control valve 10 is shown bolted to a storage tank 12 containing a pressurized fluid (e.g., LP-Gas) by means of its annular flange 14 and appropriate threaded bolts 16, which also permit attachment of similar downstream flanges. For purposes of simplifying the illustration of the present invention, only a single threaded bolt 16 is shown in FIG. 1, it being understood that any number of such bolts may be employed with the plurality of bolt holes shown in the flange 14 in FIG. 2.

Preferably, the flange 14 is formed integrally with a cast metal valve body 18 of an appropriate metal or metal alloy. The valve body defines a first interior portion, generally designed 20, which communicates with the interior of the tank 12 between four equally-spaced guide ribs or legs 22. The legs 22 may be secured to the valve body 18 by means of threaded bolts, such as that indicated at 24. As may be seen, the legs 22 extend vertically from the valve body 18 to present guide surfaces 23 and then turn inwardly to engage a cage member 32, to be described hereinafter.

Adjacent to and below the first interior portion 20, the valve body 18 defines a second interior portion, or chamber 26, which communicates with an annular outlet port 28. Between the chamber 26 and the first interior portion 20 of the control valve 10, the valve body 18 is provided with an integrally-formed, bevelled, and annular valve seat 30, which cooperates with the main valve member 42 to check fluid flow from the interior portion 20 to the chamber 26 when excess-flow conditions prevail, or when the valve is in the closed position.

At its upper end, the control valve 10 is provided with the cage member 32 which is generally cup-shaped. The cage member 32 may be formed integrally with the four guide legs 22, or welded, or otherwise appropriately secured thereto at their upper ends so as to be centered with respect to the vertical axis a of the valve 10. The cage member 32 includes a lower annular flange portion 34, whose interior surface 36 serves as a guide surface in a manner to be described hereinafter. Also provided by the cage member 32 is a second guide surface 38 formed by means of an aperture drilled through a raised boss portion 40 which depends from the upper, flat portion 41 of the cage member 32.

The main valve member 42 takes the form of a tubular member having an outwardly-extending flange portion 44 at its lower end which is received within and guided by the guide surface portion 23 of the guide legs 22 to achieve aligned reciprocal movement therewithin. The flange portion 44 of the main valve member 42 is provided with an annular disc 46, which, for example, may be an appropriate resilient-seal composition. it is positioned to register with and seal against the main valve seat 30. The cylindrical portion 43 of the main valve member 42 is shown provided with two ports or openings 48 which provide fluid communication between the interior portion 20 of the control valve 10 and the interior 50 of the main valve member 42. In addition, the cylindrical portion 43 is stepped, as indicated at 52, to form an annular lip, which upon upward movement of the valve member 42 will engage the lower surface 37 of the cage member 32, thereby to limit its upward travel. As may be best seen in FIG. 1, the upper end of the cylindrical portion 43 of the valve member 42 is received within the cage member 32 and makes sliding engagement with the guide surface 36 thereof.

A spring retainer member 54 is threaded to the cylindrical portion 43 of the main valve member 42 at its upper end and is provided with an opening 56 for purposes to be described hereinafter.

At its lower end, the interior chamber 50 of the main valve member 42 is beveled, as indicated at 58, and communicates with a pilot valve orifice 60 provided in a disc retainer plate, generally designated 62. The retainer plate 62 is shown secured to the main valve member 42 by means of bolts 64 and extends downward from the level of the main valve seat 30 a short distance into the chamber 26. The disc retainer plate 62 includes a sealing disc or valve seat 66 which forms a part of the pilot valve mechanism of the safety flow control valve 10. The sealing disc 66 is generally annular in shape and surrounds the pilot valve orifice 60 to register with and seal against a pilot valve plug member 68, now to be described.

The pilot valve member 68 is generally wedge-shaped and includes an annular, upwardly-extending flange 70, a bore 72, and a flat bottom portion 74. Between the flat bottom portion 74 and the flange 70, the pilot valve plug 68 is bevelled to correspond to the bevelled surface 58 of the main valve member 42.

Between the flange 70 of the pilot valve 68 and the retainer 54, there is provided an excess-flow spring 76 which imparts a force to the retainer 54, and, consequently, the main valve member 42 to urge them in the upward direction; that is, in a direction such that the disc 46 of the main valve member 42 is urged away from the valve seat 30. In addition, a shut-off spring 78, having a spring force substantially greater than that of the excess-flow spring 76, is provided between the pilot valve plug 68 and the cage member 32. As may be seen, the shut-off spring 78 is generally concentric with the excess-flow spring 76, and passes through the opening 56 in the retainer 54 to fit over the raised-boss portion 40 of the cage member 32.

A valve stem, generally designated 82, is provided in the safety flow control valve 10. The valve stem 82 consists of an upper stem portion 84 and a lower stem portion 86. The upper end of the upper stem portion 84 is received within the cage member 32 and slidingly engages the guide surface 38 of the raised-boss portion 40. At its lower end, the upper stem portion 84 is threaded to engage the threaded, upper end of the lower stem portion 86. At a position slightly above the threaded portion of the upper stem portion 84, there is provided a recess 87 which receives an O-ring 88 for providing a fluid-tight seal between the upper stem portion 84 and the pilot valve plug 68.

The upper end of the lower stem portion 86 engages the flat bottom portion 74 of the pilot valve plug 68. It has a diameter at its upper end chosen to provide sufficient clearance between it and the wall which defines the pilot valve orifice 60 to provide a substantially unrestricted bleed passage 90. This bleed passage 90 is opened to fluid flow when the pilot valve plug 68 is moved away to unseat the plug 68 and the disc 66. Intermediate the upper and lower ends of the lower stem portion 86, there is provided an enlarged-diameter plug portion 92, the diameter of which is chosen such that, when the stem 82 is moved upward a predetermined distance, the enlarged-diameter plug portion 92 will register with the pilot valve orifice 60 in such a manner to restrict substantially the bleed passage 90.

Pivotally mounted within the chamber 26 of the control valve 10 is a cam member, generally designated 94. The cam member 94 may be pivoted about the axis designed $b$ to engage the lower end of the lower stem portion 86 to move it to predetermined positions to effect (1) pressure equalizing, (2) excess-flow monitoring, and (3) closing positions of the control valve 10. These positions will be described in detail hereinafter. As may be best seen in FIG. 2, the cam member 94 is mechanically coupled to an actuating handle 98 positioned external to the control valve 10. The handle 98 may be actuated by any suitable means; for example, manual, hydraulic or pneumatic actuators, or the like may be employed. In actual practice, the handle 98 may cooperate with appropriate latch mechanisms (not shown) so that the cam member 94 may be readily moved to predetermined positions to be described hereinafter in connection with the operation of the valve 10. The handle 98 may be mechanically coupled to the cam member 94 through the valve body 18 by any suitable shaft and seal arrangement. For example, a shaft 100 may be provided with appropriate wipers, guides, cushion liners, packing rings, packing springs, and bushings, such as those designated by reference numbers 102, 104, 106, 108, 110 and 112, respectively in FIG. 2. Inasmuch as these parts form no part of the present invention and are well known, they will not be described in detail. Likewise, the retainer plate 115 and its associated strainer 117 (See FIG. 1) will not be described in detail.

Since the cam member 94 may transmit forces having both vertical and horizontal components to the valve stem 82, it is preferable to provide a spider or webbed guide member 114 within the chamber 26 of the control valve 10. The guide member 114 is arranged to slidably engage the enlarged-diameter plug portion 92 of the lower stem portion 86 of the valve stem 82 to prevent the misalignment which might otherwise occur.

OPERATION OF THE SAFETY FLOW CONTROL VALVE 10

Referring now to FIGS. 4, 5, 6, and 7, and assuming that one wishes to transport fluid, such as LP-gas, from the storage tank 12 by means of the internal valve 10, the first operation is to actuate the valve 10 in such a manner that the pressure across the main valve member 42 is equalized. Once this is accomplished, a pump or other means in the system may be actuated to initiate the transfer of fluid in a safe manner.

Figure 4:
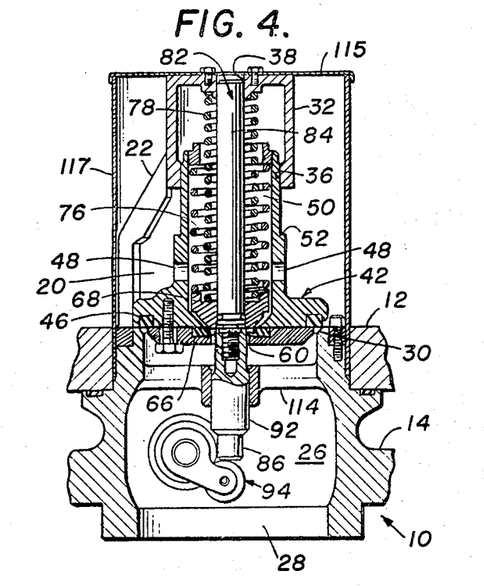
FIGS. 4, 5, 6, and 7 are schematic cross-sectional views of the valve of FIG. 1 with certain parts removed to better reveal the various positions assumed by the main valve, valve stem, and pilot valve parts in operation.

As shown in FIG. 4, prior to pressure-equalizing, the shut-off spring 78 is fully extended, because the cam 94 is in its lowermost position as shown. The force of the shut-off spring 78, together with that of the fluid pressure within the interior portion 20 of the control valve 10, maintains the discs 46 and 66 in fluid-tight sealing engagement with the main valve seat 30 and the bevelled surface portion of the pilot valve plug 68, respectively.

Figure 5:
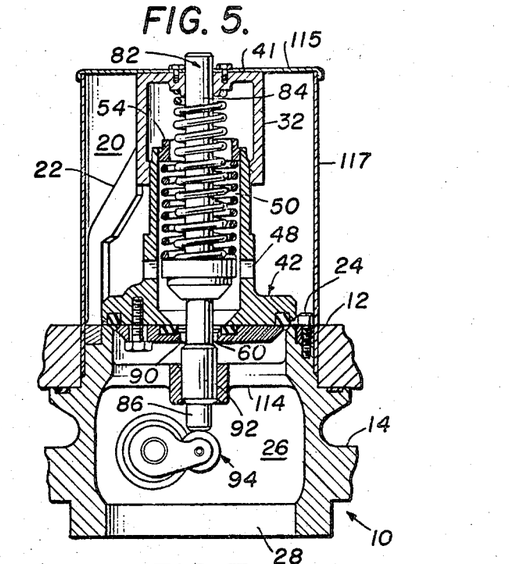

As the cam member 94 is moved from the position of FIG. 4 to the position shown in FIG. 5, the valve stem 82 is maintained in vertical alignment, by means of the guide member 114 and the guide surface 38. It moves in the upward direction, compressing the shut-off spring 78, and the excess flow spring 76. This upward movement of the valve stem 82 carries with it the pilot valve plug 68, resulting in its disengagement with the pilot valve disc 66. The valve stem 82 is moved to open the bleed passage 90. Inasmuch as the interior 50 of the main valve member 42 communicates with the chamber 20, and therefor the tank pressure, by means of the openings 48, the tank pressure bleeds through the enlarged bleed passage 90, and the fluid pressure in chamber 26 rapidly approaches that of the fluid in the storage tank 12.

Figure 6:
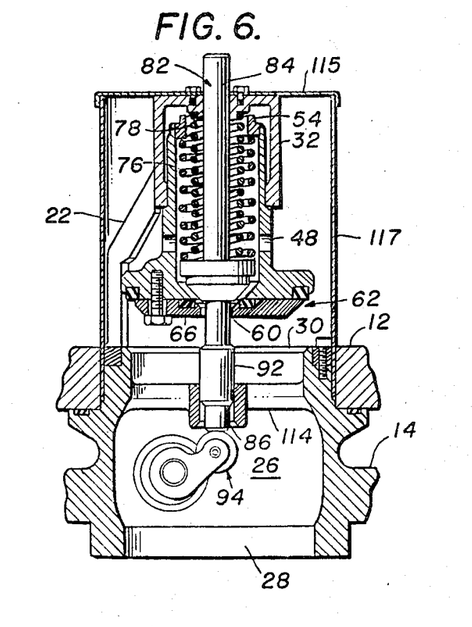
Figure 7:
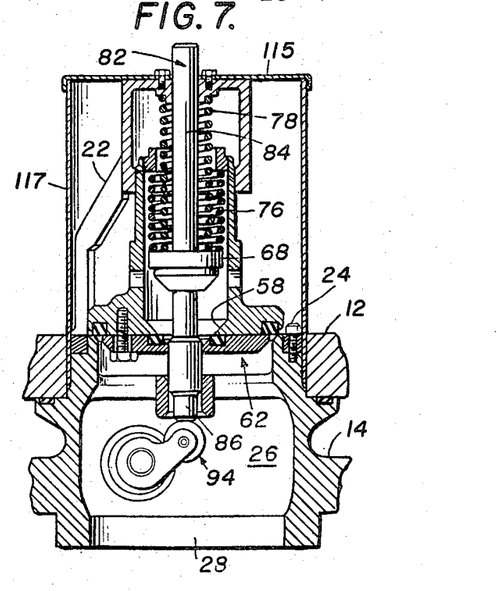

At a point in the pressure equalization process, the excess-flow spring 76, which has been compressed by the upward movement of the pilot valve plug 68, overcomes the force exerted on the main valve member 42 by the decreased pressure differential between the chambers 20 and 26. When this occurs, the main valve member 42 is abruptly forced upward along the guide surfaces of the guide legs 22 and the guide surface 36 of the cage member 32 until the lip 52 strikes the cage member 32. In this manner, the main valve member 42 is moved to its open position, and the internal valve 10 begins to transfer and monitor fluid flow from the storage tank 12. It should be noted that pressure equalization will normally occur while the valve stem 82 is in motion from the position shown in FIG. 4 because the bleed passage is large enough to effect rapid equalization. However, if the downstream piping is extensive, it may be necessary to hold the stem 82 in the position shown in FIG. 5 until pressure equalization occurs. After pressure equalization, the cam member 94 is continued to its highest-most position, as indicated in FIg. 6. This in turn moves the valve stem 82 upward until its enlarged-diameter plug portion 92 assumes a position corresponding to that of the pilot valve orifice 60 when the main valve member 42 is in its closed position, see FIG. 4. This further upward travel of the valve stem 82 compresses both the excess-flow spring 76 and the shut-off spring 78.

In the event that piping down-stream of the safety flow control valve 10 experiences a break, or upon the occurrence of some other event which results in excess-flow the resulting pressure drop across the main valve member 42 is sensed by the excess-flow spring 76, whose force is overcome by the opposing differential pressure, thereby causing the rapid return of the main valve member 42 to its closed position. When this happens, the pilot valve orifice 60 returns to its initial position and is substantially restricted by the enlarged-diameter plug portion 92 of the valve stem 82, see fIG. 7. It should be noted that the bleed orifice is substantially more restricted in this position than in the case where the stem is positioned to achieve pressure-equalization across the valve. Furthermore, this substantial restriction occurs even though the valve plug 68 is held spaced from the bleed orifice 60 as is the case when such an emergency condition occurs.

If the fluid transfer operation takes place without the occurrence of the excess-flow condition, then the operator may return the main valve 42 and the pilot valve plug 68 to their closed positions, as shown in FIG. 4, by returning the cam member 94 to its initial position. The shut-off spring 78, which is substantially stronger than the excess-flow spring 76, forces both of these members to their closed positions.

DESCRIPTION OF OTHER EMBODIMENTS OF THE INVENTION

Figure 8:
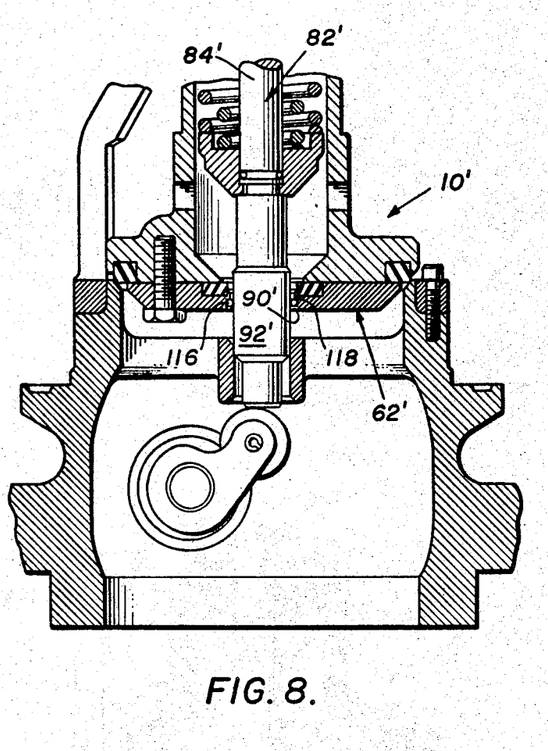
fIG. 8 is a partial, cross-sectional view of an internal control valve, similar to that of FIG. 1, employing additional seal features to effect tight shut-off when the control valve has checked shut because of an excess flow condition.

Referring now to FIG. 8, there is shown an internal control valve, generally designated 10'. The safety flow control valve 10' is substantially identical to the safety flow control valve 10 of FIGS. 1–3, however, disc retainer plate 62' is provided with a recess 116, within which is secured a suitable 0-ring 118. The 0-ring is of a size sufficient to provide a fluid-tight seal against the enlarged-diameter plug portion 92' of the valve stem 82' when the control valve 10' is actuated to assume the position shown in FIg. 8. It should be apparent that, alternatively, the 0-ring 118 could be recessed within the enlarged-diameter plug portion 92' of the valve stem 82' to effect a similar "zero" leakage closure of the bleed passage.

Figure 9A:
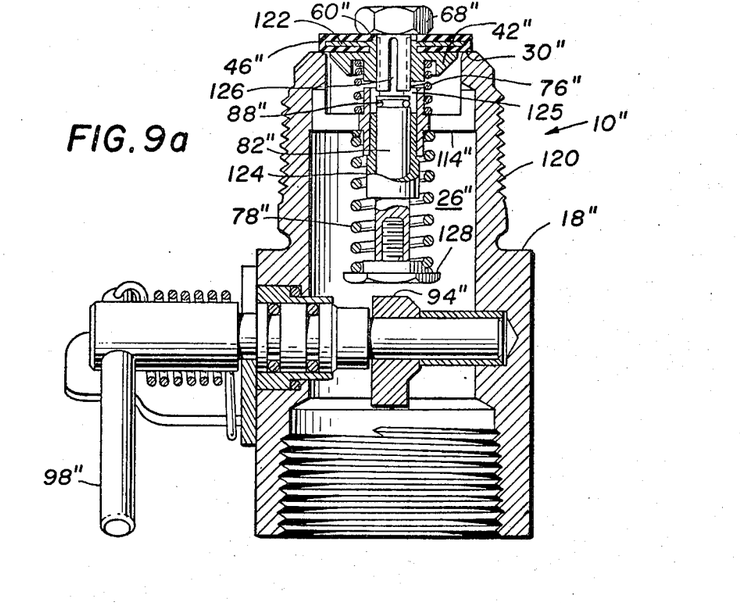
Figure 9B:
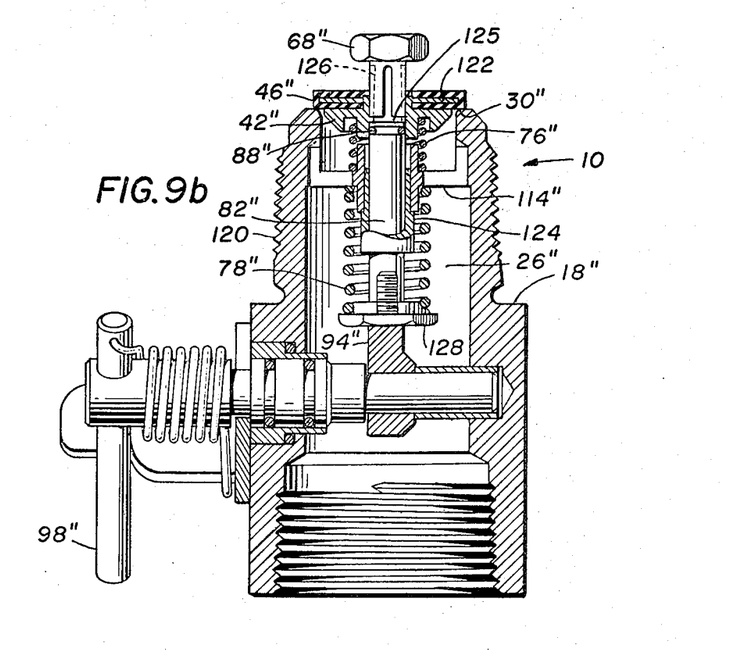

In FIGS. 9a and 9b there is shown a safety flow control valve 10" embodying the features of our invention, but modified somewhat from the valves 10 and 10' of FIGS. 1 and 8. The control valve 10" is adapted to be secured to a storage tank by means of the threads 120 provided on the upper exterior portion of its body 18'. As may be readily seen, the valve 10" includes an actuating handle 98", a cam member 94" and appropriate connection means between these parts. The main valve seat 30" is provided at the upper end of the valve body 18" and cooperates with a main valve member 42" which includes a disc-like element 122 having an appropriate resilient seal coating 46" or surface portion to seal against the seat 30".

The main valve member 42" includes a pilot valve orifice 60" through which the valve stem 82' passes. The stem 82" also passes through a guide sleeve 124 held by a spider 114" provided in the valve body 18" in the chamber 26". At its upper end the valve stem 82" is provided with a hexagon head 68" which serves as the pilot valve plug for the valve 10". A bleed passage is provided by means of four enlarged milled slots 126 in the stem 82. These slots 126 extend from the head 68" to a recess 125, and thereby allow the pressure within the tank (i.e., that area above the main valve member 42") to communicate with the chamber 26" of the control valve 10" when the stem 82" is intermediate the position shown in FIG. 9a and that position shown in FIG. 9b during actuation of the valve 10".

As may be seen, the control valve 10" is provided with a shut-off spring 78" which extends between the spider 114" and the lower flat end 128 threaded to the valve stem 82". In addition, it includes an excess-flow, sensing spring 76" which extends between the spider 114" and the main valve member 42.

An important feature of the safety flow control valve 10" is the bleed passage seal afforded by the 0-ring 88" carried in a recess provided in the valve stem 82" at a point where it can be made to register in the pilot valve orifice 60" and provide a fluid tight seal therein should the main valve member 42" check shut, while the head 68" is in the open position, as shown in FIG. 9b. Inasmuch as the operation and use of the control valve 10" is analogous to that described hereinabove with respect to valves 10 and 10", such operation and use will not be further described.

Figure 10A:
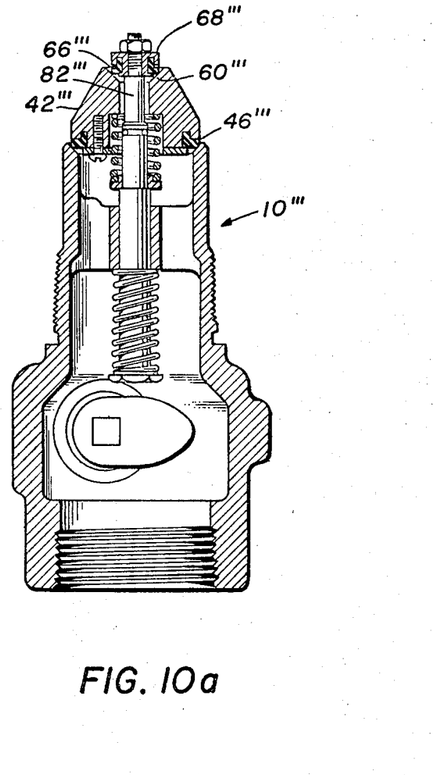
FIGS. 10a and 10b are cross-sectional views similar to FIGS. 9a and 9b, of still another embodiment of the internal valve of the present invention.
Figure 10B:
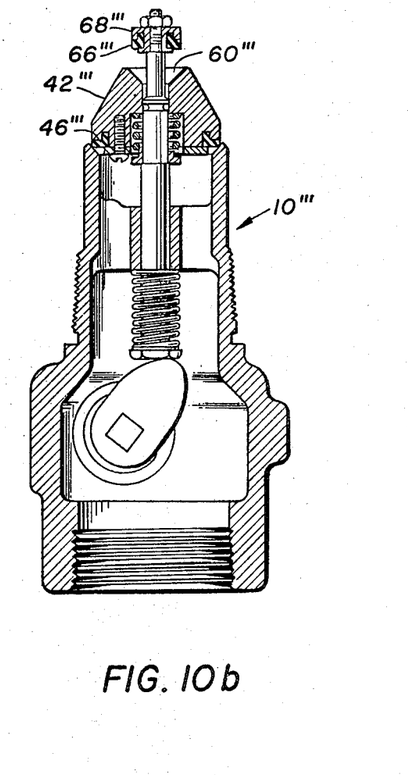

Referring now to FIGS. 10a and 10b, there is shown yet another control valve, designated 10''', embodying the features of our invention. The control valve 10''' is similar to the control valve 10", except in the following respects: Control valve 10''' is provided with a main valve member 42''' which has a annular disc 46''' which registers with the valve seat, and a seal disc 66''' which is carried on the valve stem 82''' below the pilot valve plug head 68''' to seal the flared pilot valve orifice 60'''. The control valve 10''' is shown in two of its positions in FIGS. 10a and 10b; in FIG. 10a the pilot valve and main valve are both shown in the closed position, while in FIG. 10b the pilot valve is shown in the open position and the main valve shown in the closed position. Like the valve 10" of FIG. 9, the valve 10''' has an 0-ring seal 88''' adapted to tightly seal the bleed passage through the main valve member 42''' in emergencies.

In summary, the instant invention provides an internal control valve which permits a substantially unrestricted bleed passage to achieve rapid pressure equalization, in combination with seal means for restricting the bleed passage in the event the valve checks shut due to emergency, excess-flow conditions.

Obviously, many modifications and variations are possible in view of the above teachings. Therefore, it is to be understood, that the invention may be practiced otherwise than as specifically described.

We claim:

1. An internal control valve, comprising
   generally annular main valve means disposed about a central axis and having upstream and downstream sides and excess-flow sensing means, said main valve means being arranged to be actuated from its open to its closed positions upon the occurrence of an excess-flow condition by said excess-flow sensing means and differential pressure across same,
   pilot valve seat means carried by said main valve means,
   a slidably disposed valve stem extending axially and passing through said pilot valve seat means and having a portion defining with said pilot valve seat means, a substantially unrestricted rapid pressure-equalizing bleed passage communicating with both sides of said main valve means,
   pilot valve plug means mechanically coupled to and actuated by said valve stem and including a first part for opening said bleed passage from said upstream side and a second axially elongated part including means radially dimensioned to fit within and substantially close said bleed passage when said elongated portion is actuated from said downstream side of said main valve member into a position where it will register within said bleed passage, and
   means for actuating said valve stem to predetermined positions where said first part and said second part of said pilot valve plug means open from said upstream side and close from said downstream side, respectively, said bleed passage.

2. The valve as defined in claim 1, wherein said portion of said valve stem for defining said bleed passage includes a slot within said valve stem.

3. The valve as defined in claim 1, wherein said radially dimensioned means includes resilient o-ring seal means carried by said valve stem and of a size sufficient to close said bleed passage when registered therewithin.

4. An internal valve adapted for rapid pressure equalization and fluid transfer, comprising
   a valve body including guide means, an outlet port, and a main valve seat, said valve body defining a chamber positioned between said main valve seat and said outlet port,
   generally annular main valve means received in said guide means of said valve body for axially reciprocal movement toward and away from said main valve seat, said main valve means including biasing means for normally urging said main valve means for engagement with its valve seat, and further including pilot valve seat means communicating with said chamber,
   pilot valve means for opening and closing said pilot valve seat means and including biasing means for normally urging said pilot valve means to its closed position,
   pilot valve actuating means slidably disposed and extending from within said valve chamber axially through said pilot valve seat means, said pilot valve actuating means mechanically coupled to and co-operating with said pilot valve means and including a reduced-diameter part which cooperates with said pilot valve seat means to provide a substantially unrestricted bleed passage of a size sufficient to allow rapid equalization, and an axially elongated cylindrical portion which is radially dimensioned to cooperate with and fit within said pilot valve seat means when actuated from the downstream side thereof to effectively restrict flow therethrough, and
   means within said chamber of said valve body to actuate said pilot valve actuating means to predetermined positions to selectively open from the upstream side and close from the downstream side, respectively, said bleed passage.
   whereby fluid pressure on opposite sides of said valve means may be rapidly equalized and said pilot valve bleed passage may be effectively closed automatically in emergency situations even though said pilot valve means remains in its open position.

5. The valve as defined in claim 4, further comprising seal means provided within said pilot valve seat means,
   together with
   said axially elongated cylindrical portion of said pilot valve actuating means having an enlarged diameter portion adapted to seal against said seal means to provide a tight shut-off seal when said enlarged diameter portion is registered therewith.

6. The valve as defined in claim 5, wherein said seal means is a resilient O-ring.

7. The valve as defined in claim 4, wherein said means for actuating said pilot valve actuating means comprises
   cam means pivotally mounted to said valve body, together with
   means within said chamber and slidably engaging said pilot valve actuating means to prevent misalignment with respect to said pilot valve seat means upon and during its actuation.

8. The valve as defined in claim 4, wherein said main valve means, comprises
   a tubular member having a resilient seal portion for registering with said valve seat, said tubular member defining a flow passage within which said pilot valve means is housed with sufficient tolerance with respect to the walls defining said flow passage such that fluid may flow around said pilot valve means in its open position,
   a disc retainer plate affixed to said tubular member and including a central pilot orifice aperture, said pilot orifice aperture communicating with said flow passage of said tubular member and said chamber of said valve body, and
   a resilient disc retained in said disc retainer plate in close proximity to said pilot orifice aperture and positioned to register with said pilot valve means in its closed position.

9. A valve structure adapted for securing to a container for controlling the flow of fluid therefrom, comprising
   a generally tubular valve body including a first interior portion adapted to communicate with the interior of such container and a second interior portion adjacent thereto and communicating with a valve outlet,
   a valve seat intermediate said first and second interior portions of said valve body,
   generally annular main valve means disposed about a central axis in said first interior portions of said valve body and adapted to engage said valve seat, said main valve means including spring means having a predetermined spring force and acting upon said main valve means to normally urge said main valve means from engagement with said valve seat, a cental pilot valve orifice carried by said main valve means and providing fluid flow communication between said first and second interior portions of said valve body,
   pilot valve means disposed in said first interior portion of said valve body for opening and closing said pilot valve orifice, said pilot valve means including spring means having a predetermined spring force for normally urging said pilot valve means to close said pilot valve orifice,
   elongated slidably disposed stem means extending from said second interior portions of said valve body axially through said pilot valve orifice to said first interior portions, said stem means engaging said pilot valve means and including a portion intermediate its ends adapted to provide a substantially unrestricted bleed passage of a size sufficient to allow rapid transfer of fluid when said intermediate portion is registered with said pilot valve orifice,
   axially elongated restricting means carried by said stem means and of larger diameter than said intermediate portion, said restricting means being positioned on the said second interior portion side of said intermediate portion of said stem means and radially dimensioned to fit within and substantially close said pilot valve orifice when said restricting means is registered therewith, and
   means engaging said stem means for actuating thereof to selectively open said pilot valve orifice, thereby to allow fluid flow from said first interior portions through said bleed passage through said second interior portions to effect said opening of said main valve means.

\* \* \* \* \*